United States Patent
Thomas

(10) Patent No.: US 6,757,666 B1
(45) Date of Patent: Jun. 29, 2004

(54) LOCALLY CONNECTED NEURAL NETWORK WITH IMPROVED FEATURE VECTOR

(75) Inventor: Tyson Thomas, San Francisco, CA (US)

(73) Assignee: California Institute of Technology, Pasadena, CA (US)

( * ) Notice: Subject to any disclaimer, the term of this patent is extended or adjusted under 35 U.S.C. 154(b) by 0 days.

(21) Appl. No.: 09/549,216

(22) Filed: Apr. 13, 2000

Related U.S. Application Data

(60) Provisional application No. 60/129,385, filed on Apr. 13, 1999.

(51) Int. Cl.[7] ................................................. G06N 3/02
(52) U.S. Cl. .......................................... 706/15; 706/16
(58) Field of Search ..................... 706/15, 16; 342/159; 378/62; 382/100, 157, 291

(56) References Cited

U.S. PATENT DOCUMENTS

| | | | | |
|---|---|---|---|---|
| 4,906,940 A | * | 3/1990 | Greene et al. | 382/100 |
| 5,161,204 A | * | 11/1992 | Hutcheson et al. | 382/157 |
| 5,274,714 A | * | 12/1993 | Hutcheson et al. | 382/157 |
| 5,465,308 A | * | 11/1995 | Hutcheson et al. | 382/159 |
| 5,598,355 A | * | 1/1997 | Derou et al. | 342/159 |
| 5,745,382 A | * | 4/1998 | Vilim et al. | 706/16 |
| 5,799,276 A | * | 8/1998 | Komissarchik et al. | 704/251 |
| 5,805,745 A | * | 9/1998 | Graf | 382/291 |
| 5,859,891 A | * | 1/1999 | Hibbard | 378/62 |

\* cited by examiner

Primary Examiner—Wilbert L. Starks, Jr.
(74) Attorney, Agent, or Firm—Fish & Richardson P.C.

(57) ABSTRACT

A pattern recognizer which uses neuromorphs with a fixed amount of energy that is distributed among the elements. The distribution of the energy is used to form a histogram which is used as a feature vector.

20 Claims, 7 Drawing Sheets

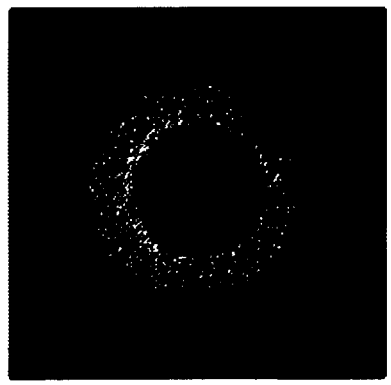
FIG. 5B-2
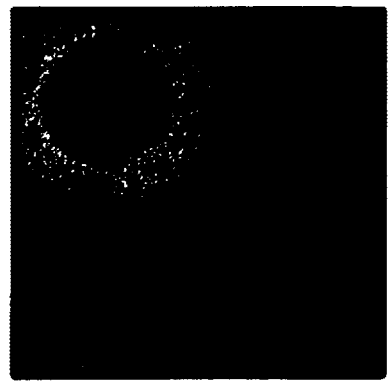
FIG. 5D
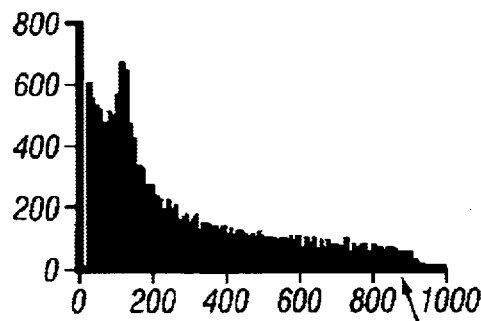
FIG. 5C  — ACTIVATION ENERGY
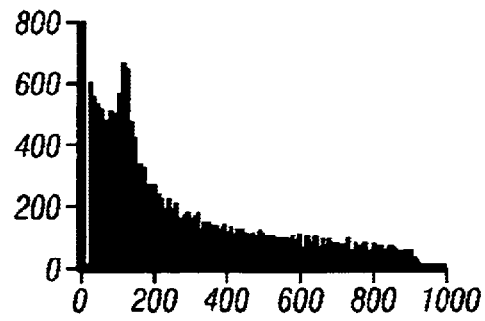
FIG. 5E

LOCALLY CONNECTED NEURAL NETWORK WITH IMPROVED FEATURE VECTOR

CROSS-REFERENCE TO RELATED APPLICATIONS

This application claims benefit of U.S. Provisional Application No. 60/129,385, filed Apr. 13, 1999.

STATEMENT AS TO FEDERALLY-SPONSORED RESEARCH

The U.S. Government may have certain rights in this invention pursuant to Grant No. 7-1407 awarded by NASA.

BACKGROUND

Pattern recognition systems can be used for many different functions, including recognition of elements within scenes, matching of one feature to another feature and other functions. Pattern recognition can be used for detecting fingerprints for example.

Pattern recognition can be complicated by the different parameters which are set by the system. For example, these parameters can include the actual orientation of the item being imaged as well as other features about the item.

SUMMARY

The present application teaches a system for allowing and classifying pattern recognition. This pattern recognition may use a special feature vector.

BRIEF DESCRIPTION OF THE DRAWINGS

These and other aspects will now be described in detail with respect to the accompanying drawings, wherein:

FIGS. 5A–5E shows a dot in different positions, and histograms for that dot;

DETAILED DESCRIPTION

Figure 1:
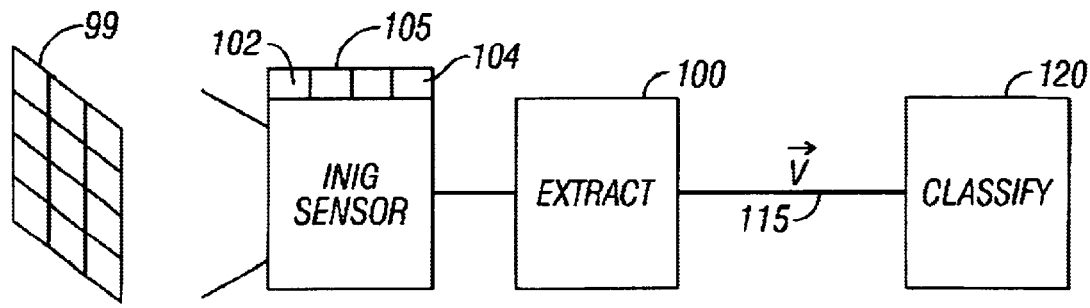
FIG. 1 is a block diagram of a pattern recognizer.

FIG. 1 shows a pattern recognition system having two stages. A first extractor stage 100 extracts information from the "image" to be pattern-recognized. The information can be extracted in the form of a feature vector 115. The feature vector can represent various information about the image to be classified. Once the feature vector is properly obtained, a classification system 120, which can be any of a number of different systems, can be used to classify the information. A variety of techniques, including nearest neighbor and neural network techniques, may be used to perform the final classification of the generated feature vector 115 to complete the recognition of the input pattern.

Figure 2:
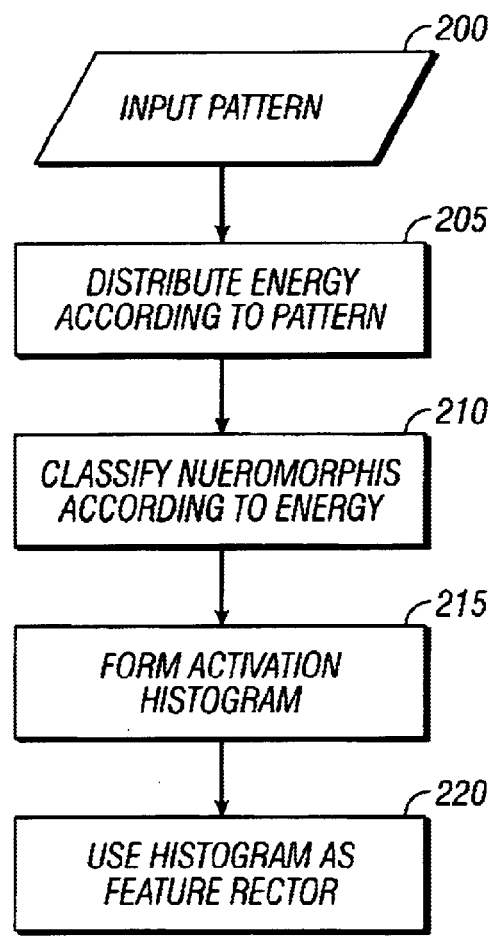
FIG. 2 shows a flow chart of operation.

The extractor stage 100 can be a neural network formed of a plurality of pixels 102, 104. The input pattern 99 is presented to the network. This input pattern can be stored digitally at each pixel location 102, or can be sensed directly by a sensing element. The basic functional unit of the network is called a neuromorph to distinguish it from generic artificial neurons or perceptrons found in the literature. This input pattern forms the feeding inputs to neuromorphs. The neuromorphs are spatially co-located with the input pixels. The neuromorphs carry out the processing as disclosed herein and as shown in the flowchart of FIG. 2.

The neuromorphs use the input pattern 99 as feeding inputs at 200. Local neighborhood connections are formed between the neuromorphs, forming linking inputs. In operation, the entire network of neuromorphs competes for a fixed resource of energy at 205. Each neuromorph adds its feeding and linking inputs. The ratio of this total, to the sum of totals for all neuromorphs in the network, to determine the share of the fixed energy. The fixed energy sets new activation levels as energy distributes itself over time across the network as a function of the spatial locations of the feeding and the linking inputs. Hence, the network "settles" into an equilibrium condition that is based on the input pattern 99.

Once the network has stabilized, each neuromorph is active with a percentage of the total energy that is based on the input pattern. The neuromorph is said to be "active" with an "activation energy". The different neuromorphs each have a different amount of energy. The neuromorphs are classified according to their activation energy at 210. This classification is used to form an activation histogram 215. This histogram is formed by counting the number of neuromorphs that have settled into each range of activation. This histogram is then used as the feature vector that is representative of the original input pattern 220.

This feature vector is relatively invariant to rotation due to its network symmetry. It is also invariant to translation due to histogramming. Therefore, this feature vector captures local global and relational characteristics of the input pattern. The feature vector can be used in a classifier for final recognition.

Figure 3:
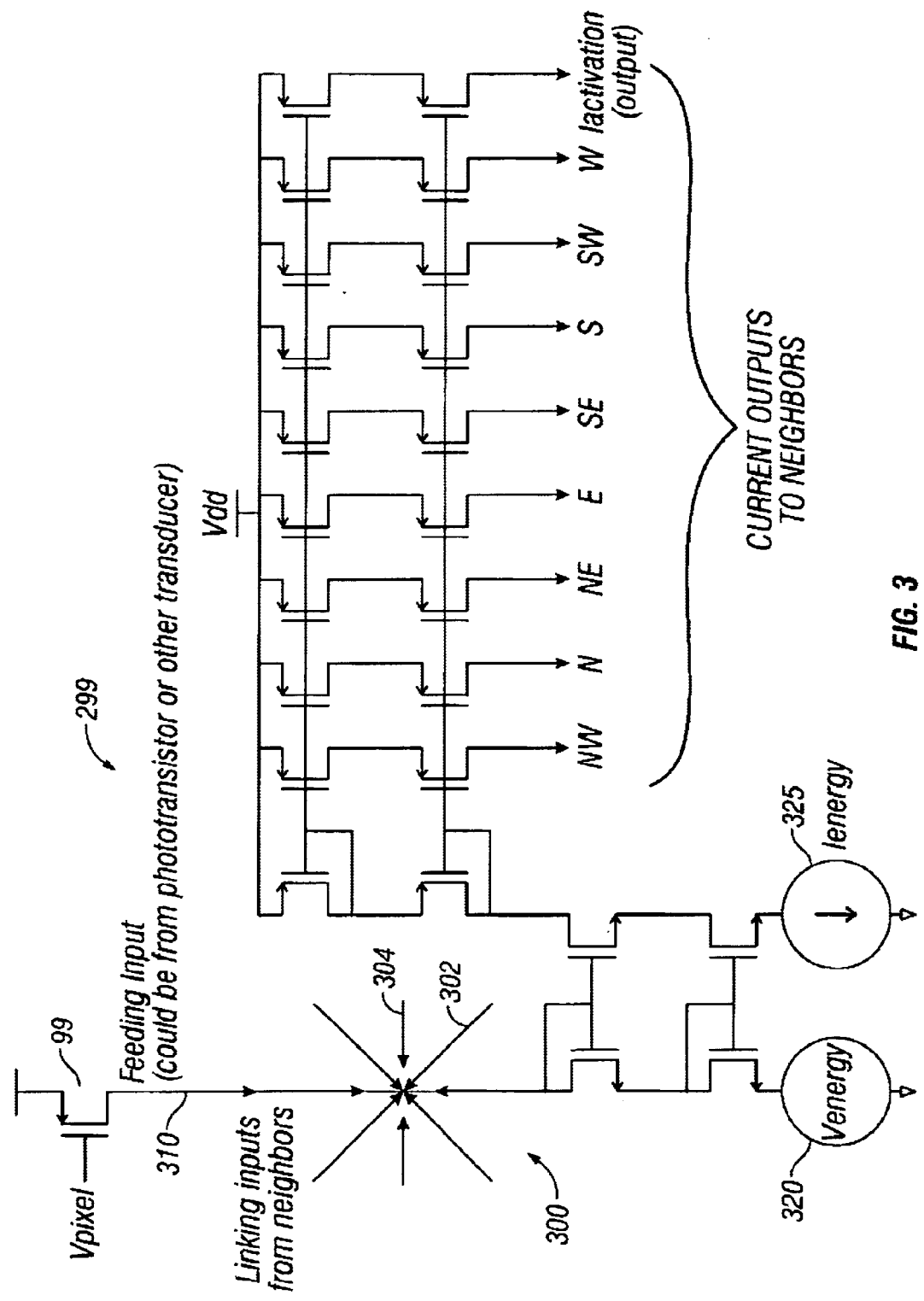
FIG. 3 shows a schematic of a circuit including a neuromorph.

The neuromorphs are shown in FIG. 3. The activation of a neuromorph at any particular spatial location is a function of both the local feeding input from the photodetector 99 and also the linking input 302 formed from the activations at its neighbors. Thus, even locations without any feeding input, i.e. inactive pixel locations, still receive influence from their neighbors and obtain a non-zero activation value.

Shunting inhibition is used to prevent an activation explosion that could occur from the positive feedback in the linking connections. The shunting inhibition is carried out by limiting the network energy to a fixed level. The neuromorphs compete with each other for a limited activation resource; here the energy of the network. This energy is fixed by using voltage source 320 and current source 325. Venergy is a network voltage supply nominally set to around 20% of Vdd, while Ienergy is a network fixed current source implemented with a cascode whose value is a function of the total network size (nominally around several microamps per neuromorph). Since the network is recurrent and therefore represented by a dynamic equation, its activation can be computed iteratively in computer simulations.

The update for a single neuromorph proceeds by first calculating the weighted sum of the local neighborhood. The weights represent the synaptic connection or linking strengths. A simple case is to keep all weights the same in order to achieve rotation and translation invariance through symmetry and uniformity.

The feeding input pixel value from the original input pattern is jammed with the linking input.

When these operations have been completed for the entire network, the energy is divided by the sum of all the new activation values and original pixel values and multiplied by the energy to get the new local activation level. The new activation levels are calculated for each neuromorph over the entire network. Then this activation is scaled as a fraction of the total activation in the entire network.

Each neuromorph therefore settles to some percentage of the total energy. The settled value is based on the percentage of the activation of the total network activation.

Mathematically, the network activation is iteratively computed by:

$$\alpha_{ij}(n+1) = \frac{I_{ij} + \sum_{kl \in N_r(ij)} [w_{ij;kl} \cdot \alpha_{kl}(n)]}{\sum_{ij} \left( I_{ij} + \sum_{kl \in N_r(ij)} [w_{ij;kl} \cdot \alpha_{kl}(n)] \right)} \cdot E$$

where,
- $kl \in N_r(ij)$ are the coordinates kl of a point that falls within a radius r of the neighborhood of neuromorph ij;
- $\alpha_{kl}(n)$ is the current activation level of neuromorph kl in $N_r(ij)$;
- $W_{ij;kl}$ is the weight of the synaptic or linking connection between neuromorph ij and neuromorph kl;
- $I_{ij}$ is the input pattern pixel value at location ij;
- E is the global network energy constant;
- n is the iteration number.

The network has settled when each neuromorph has an activation level that remains fixed.

The feature vector is obtained at 220 from the activation histogram. The number of bins in the histogram is adjustable depending on the application. Generally, too many bins can cause the histogram to be sensitive to slight variations in the input pattern which may be caused by edge or finite resolution effects. In contrast, too few bins the histogram can reduce resolution, minimum and maximum activation levels can also be determined ad hoc for the pattern type. For example, small patterns with large uniform backgrounds (e.g. written characters) will have many neuromorphs in low activation bins of the histogram that do not represent much "useful" information about the pattern. In this case, one might consider forming the feature vector only using bins that contain activations above a certain threshold. Conversely, for more uniform patterns (e.g. fingerprints) that have a more Gaussian looking histogram distribution, one might want to keep the full range of activations can cause difficulty differentiating between input patterns. Every neuromorph's activation level falls into a bin or alternatively into a set of bins. A set of bins can make the histogram smoother and more continuous. The feature vector is formed with the same dimension as the number of bins in the histogram. The values in each dimension represent the number of neuromorphs that fall into the particular activation level's bin.

The techniques described above form a locally-connected neural network (LCNN). This can be implemented in a variety of ways. One specific embodiment uses parallel-connected analog complementary metal-oxide silicon (CMOS) circuitry as shown in FIG. 3. Hardware implementation substantially increases processing speed while reducing power by several orders of magnitude. Analog integrated circuits for the LCNN can be combined with active pixel sensors being used as the photoreceptor 99, to produce invariant pattern recognition on a single chip.

In practice, it may not make sense to implement a large network neighborhood in hardware. In fact, the wiring overhead can become substantial, reducing the number of neuromorphs that can be implemented in a single network on a chip.

Figure 4:
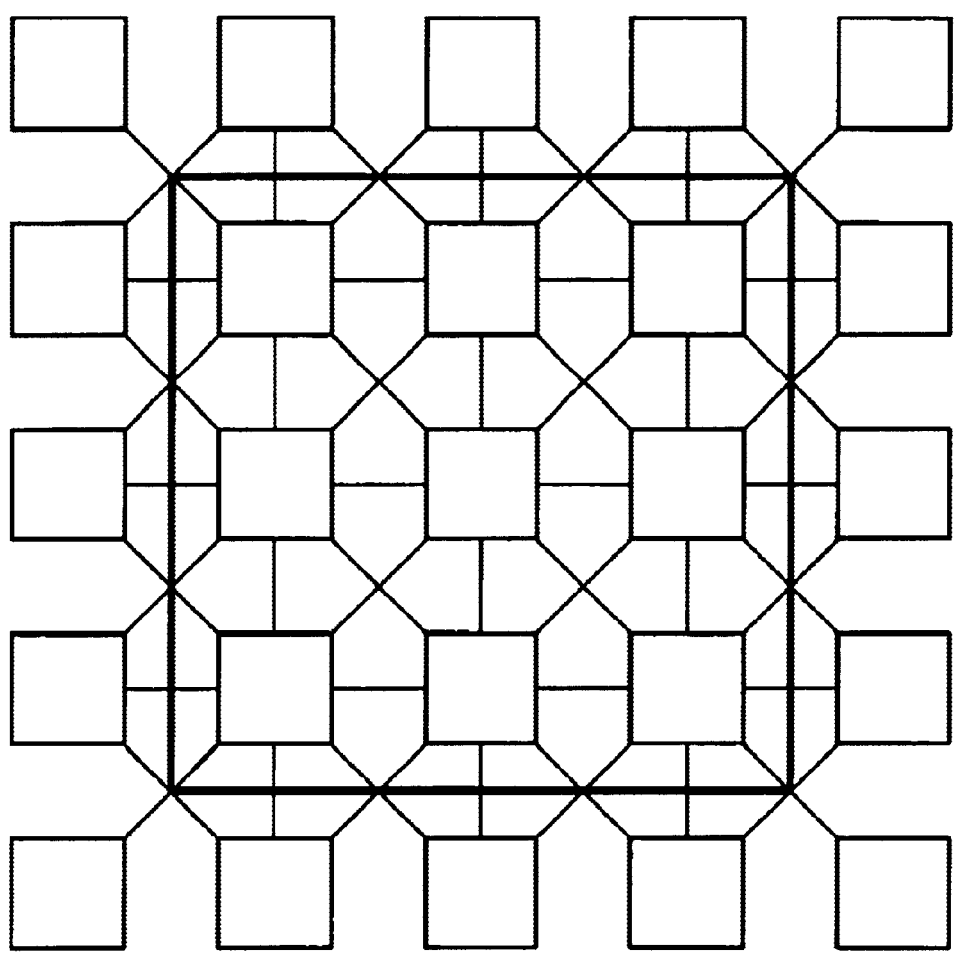
FIG. 4 shows an alternative connection.

The first arrangement shown in FIG. 3 only has connections for the first level neighborhood. FIG. 4 shows first level neighborhood connections for an array of neuromorphs, represented by boxes as they might appear in a typical network.

The weights or linking strengths between the network nodes can also be important. Keeping all linking weights as equal can maintain symmetry for rotational and translational invariance. The magnitude of the linking weight, however, may change the behavior of the network without destroying the invariance. In practice, a larger weight multiple tends to accentuate regions of higher pattern density, while blurring the network energy distribution away from the original input pattern shape. In the limit of very large weights, the input pattern may be lost. In this case, the feature vector generated by the network may lose its utility.

Lower weights tend to preserve the structure of the original input pattern, but decrease the amount of communication between pattern regions. This creates a feature vector that is less representative of the relative spatial relationship between input pattern pixels. In the limit of very small weights, the feature vector generated by the network may be a simple input pattern intensity histogram without any information about the relative spatial relationships of pattern regions.

A fixed weight (linking strength) may be implemented in the neuromorph circuit of FIG. 3 by changing the ratio of sizes of the transistor sizes of the cascode current mirrors that form the neighborhood output connections. In most simulations, as well as the actual hardware implementation, the connectivity weights have been set to one. However, certain pattern classes may benefit from higher or lower weight strengths.

Figure 5A:
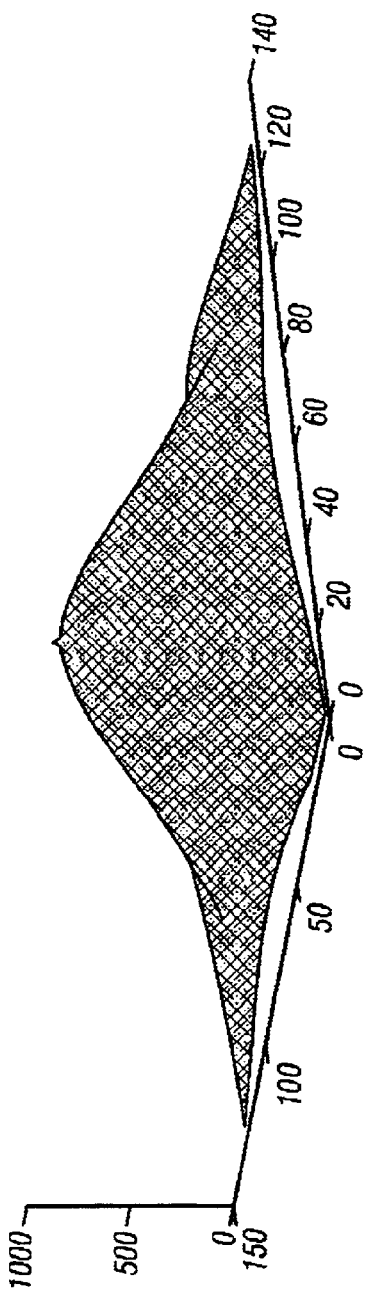
Figures 1, 5B:
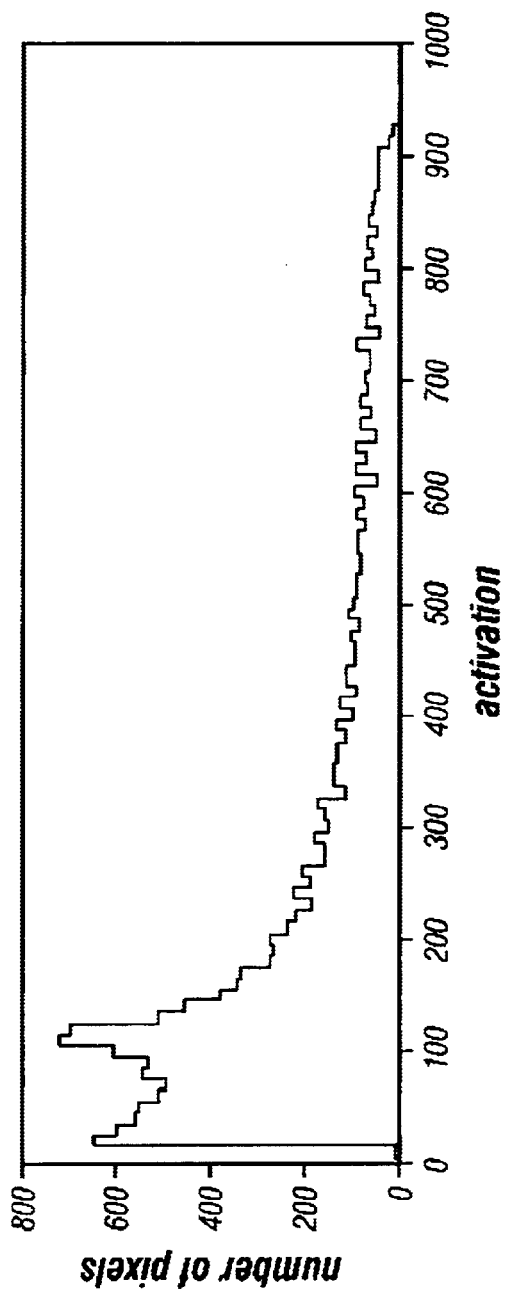

Examples of the concepts are shown in the following drawings. FIG. 5A shows a side-on view of a "dot". The dot is shown on-center in. FIG. 5B, and off-center in FIG. 5D. In FIG. 5D, parts of the dot wrap around over the edge of the scene. The histograms for FIGS. 5B and 5D are respectively shown in FIGS. 5C and 5E. These histograms show activation energy amounts on the x axis, and numbers of pixels which have that activation energy in the y axis. Note that the histograms are substantially the same (e.g. within 10%) for the two "dots". This shows that the dot shape can be recognized independent of its position.

FIGS. 6A–6J show different patterns, and the histogram feature vectors for those patterns. Each of the feature vectors is different.

Figure 6A:
FIGS. 6A–6J show different shapes, and different histograms for those shapes.
Figure 6B:
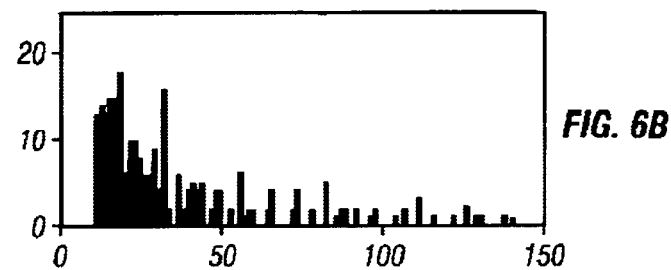
Figure 6C:
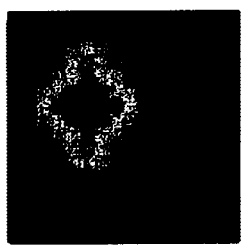
Figure 6D:
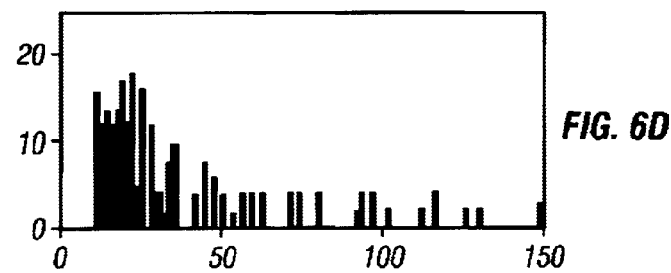
Figure 6E:
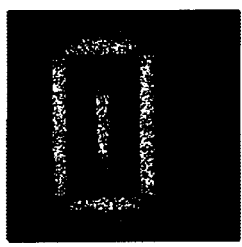
Figure 6F:
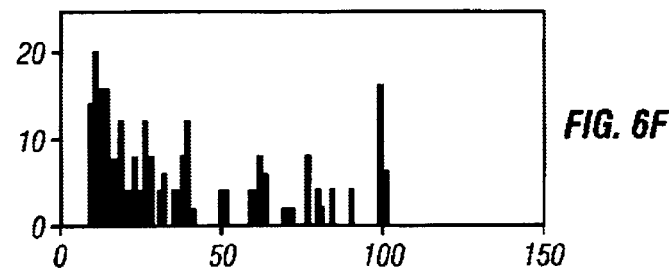
Figure 6G:
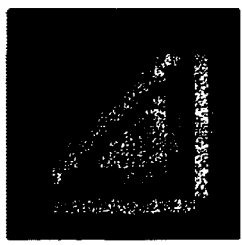
Figure 6H:
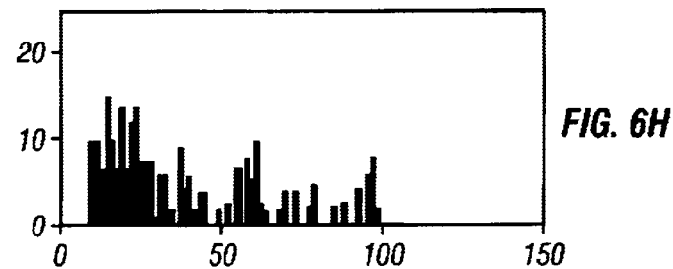
Figure 6I:
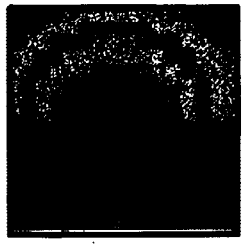
Figure 6J:
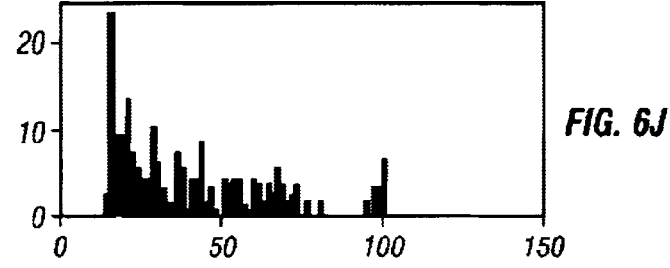
Figure 7A:
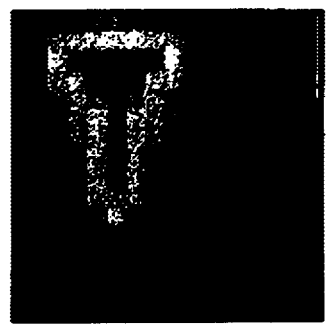
FIGS. 7A–7F show another shape in different orientations and respective histograms for that shape.
Figure 7D:
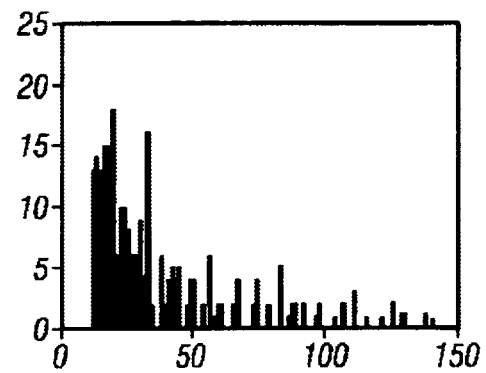
Figure 7B:
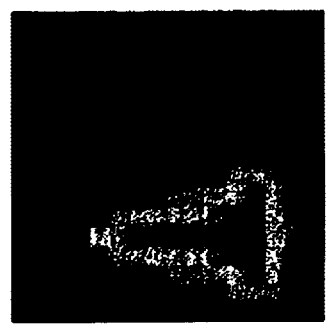
Figure 7E:
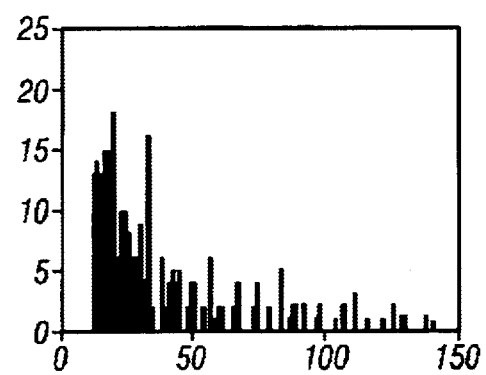
Figure 7C:
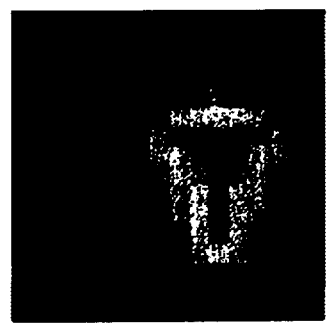
Figure 7F:
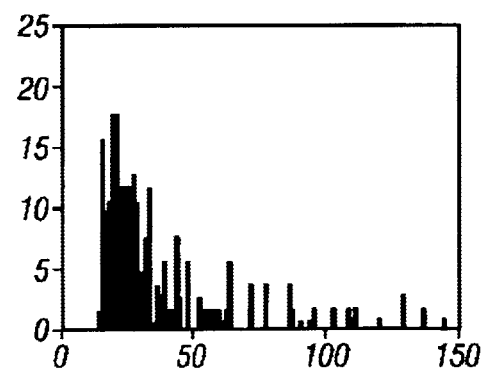

The shape in FIG. 6A is shown in three different positions in FIGS. 7A, 7B and 7C. FIGS. 7D, 7E and 7F show the histograms for these positions; these are substantially the same, and hence can be used to recognize the shape.

Other modifications are contemplated.

What is claimed is:

1. A method of pattern recognition, comprising:
   obtaining an image to be pattern recognized;
   forming a feature vector representing said image, said feature vector being indicative of a histogram of information, where each element of the histogram represents a number of parts of the image which have attained a specified energy level; and
   applying pixels of the input image to neuromorphs which respond to a feature of the input image, each said neuromorph attaining an energy level based on said features of the image.

2. A method as in claim 1, wherein there is a fixed amount of energy for the entire image, and said neuromorphs apportion said fixed amount of energy.

3. A method as in claim 2, further comprising allowing the network of neuromorphs to settle once an input image is received, and characterizing each of the neuromorphs according to an energy activation level thereof.

4. A method as in claim 3, wherein said specified energy levels are activation levels, and further comprising sensing activation levels of each of the neuromorphs, classifying the activation levels, and forming said histogram based on a number of neuromorphs in a specified level.

5. A method as in claim 4, further comprising assigning a fixed energy amount to the network, and allowing said neuromorphs to distribute said fixed energy amount to form said activation levels.

6. A method as in claim 5, further comprising using the feature vector in a classifier for final recognition of a pattern represented by the image.

7. A method as in claim 1, wherein each said neuromorph forms an input to other neuromorphs and receives outputs from other neuromorphs.

8. A method as in claim 1, wherein said classifying comprises providing a plurality of elements and interconnecting said elements.

9. A method as in claim 1, further comprising weighting the elements.

10. A method of pattern recognition, comprising:

obtaining an image to be pattern recognized; and forming a feature vector representing said image, said feature vector being indicative of a histogram of information, where each element of the histogram represents a number of parts of the image which have attained a specified energy level;

detecting network activation according to $$\alpha_{ij}(n+1) = \frac{I_{ij} + \sum\limits_{kl \in N_r(ij)} [w_{ij;kl} \cdot \alpha_{kl}(n)]}{\sum\limits_{ij} \left( I_{ij} + \sum\limits_{kl \in N_r(ij)} [w_{ij;kl} \cdot \alpha_{kl}(n)] \right)} \cdot E$$

where, kl∈$N_r$(ij) are the coordinates kl of a point that falls within a radius r of the neighborhood of neuromorph ij;

$\alpha_{kl}$(n) is the current activation level of neuromorph kl in $N_r$(ij)

$W_{ij;kl}$ is the weight of the synaptic or linking connection between neuromorph ij and neuromorph kl;

$I_{ij}$ is the input pattern pixel value at location ij;

E is the global network energy constant;

n is the iteration number.

11. A method of pattern recognition, comprising:

obtaining an image to be pattern recognized;

forming a feature vector representing said image, said feature vector being indicative of a histogram of information, where each element of the histogram represents a number of parts of the image which have attained a specified energy level; and wherein there is a fixed amount of energy for the entire image, and said neuromorphs apportion said fixed amount of energy; and adjusting a number of bins in a histogram, which number of bins represents the number of locations where elements representing specified energy amounts can be stored based on an application.

12. A method as in claim 11, wherein said application is fingerprint recognition.

13. A recognition system, comprising:

an image sensor element; and a pattern recognizing element outputting a feature vector, said feature vector having characteristics which are rotation invariant, said classifying element operating using a fixed amount of energy, and allocating the fixed amount of energy among multiple elements of the classifying circuit depending a feature of the image;

wherein the feature vector represents a histogram indicating how many pixels have specified energy amounts;

wherein the histogram includes a number of neuromorphs that are in each range of activation energy, and said feature vector is indicative of the histogram.

14. A system as in claim 13, wherein the histogram is also substantially invariant to translation.

15. A recognition system, comprising:

an image sensor element;

a pattern recognizing element outputting a feature vector, said feature vector having characteristics which are rotation invariant, said classifying element operating using a fixed amount of energy, and allocating the fixed amount of energy among multiple elements of the classifying circuit depending a feature of the image; and further comprising providing a fixed current source for energy.

16. A method of recognizing a pattern, comprising:

linking between a plurality of elements, each of which obtains information indicating a pixel of the pattern; and inhibiting positive feedback in the linking.

17. A method as in claim 16, wherein said inhibiting comprises limiting a total amount of energy available to all of the plurality of elements.

18. A method as in claim 17, further comprising forming a feature vector based on a distribution of the energy.

19. A method as in claim 18, wherein said feature vector is representative of a number of elements in each bin of a histogram of energy distribution.

20. A method as in claim 19, further comprising only using bins that include activations among above a specified threshold.

* * * * *